(12) United States Patent
Pei

(10) Patent No.: US 10,563,811 B2
(45) Date of Patent: Feb. 18, 2020

(54) DISPLAY WALL MOUNT

(71) Applicant: Xubo Pei, Shenzhen Guangdong (CN)

(72) Inventor: Xubo Pei, Shenzhen Guangdong (CN)

(*) Notice: Subject to any disclaimer, the term of this patent is extended or adjusted under 35 U.S.C. 154(b) by 0 days.

(21) Appl. No.: 16/018,807

(22) Filed: Jun. 26, 2018

(65) Prior Publication Data

US 2019/0390817 A1 Dec. 26, 2019

(51) Int. Cl.
*F16M 13/02* (2006.01)
*A47F 5/00* (2006.01)
*F16M 11/08* (2006.01)
*F16M 11/18* (2006.01)
*F16M 11/20* (2006.01)

(52) U.S. Cl.
CPC ............ *F16M 11/08* (2013.01); *F16M 11/18* (2013.01); *F16M 11/2014* (2013.01); *F16M 11/2092* (2013.01); *F16M 13/02* (2013.01)

(58) Field of Classification Search
CPC ....... A47B 97/001; F16M 11/00; F16M 13/00
See application file for complete search history.

(56) References Cited

U.S. PATENT DOCUMENTS

| | | | | | |
|---|---|---|---|---|---|
| 4,063,377 | A * | 12/1977 | Hukill | ...................... | G09F 9/37 40/447 |
| 7,448,584 | B2 * | 11/2008 | Chen | ...................... | F16M 11/10 248/122.1 |
| 7,784,757 | B2 * | 8/2010 | Woods | .................. | F16M 11/10 248/231.91 |
| 8,693,172 | B2 * | 4/2014 | Russell | .................. | F16M 11/10 361/679.01 |
| 9,782,004 | B2 * | 10/2017 | Yu | .......................... | F16M 13/02 |
| 2003/0151701 | A1 * | 8/2003 | Sedighzadeh | ....... | E05B 73/0082 348/825 |
| 2018/0177299 | A1 * | 6/2018 | Pei | ....................... | A47B 97/001 |

OTHER PUBLICATIONS

NPL Internet Search log; 2019. (Year: 2019).*

* cited by examiner

*Primary Examiner* — Luis Perez-Fuentes
(74) *Attorney, Agent, or Firm* — Hauptman Ham, LLP

(57) ABSTRACT

The present disclosure provides a display wall mount, configured for mounting a display on a wall. The display wall mount includes a first connecting mechanism, an intermediate connecting mechanism and a second connecting mechanism. The first connecting mechanism is coupled to the wall. The first connecting mechanism includes a wall plate coupled to the wall and a connecting frame capable of sliding relative to the wall plate. The second connecting mechanism is coupled to the display. Two ends of the intermediate connecting mechanism are rotatablely coupled to the connecting frame and the second connecting mechanism respectively. The display wall mount can adjust the mounting position of the connecting frame conveniently, thereby facilitating to adjust the mounting position of the display. The display can adjust a viewing angle through the first connecting mechanism, the intermediate connecting mechanism and the second connecting mechanism, which is convenient for using.

17 Claims, 14 Drawing Sheets

DISPLAY WALL MOUNT

TECHNICAL FIELD

The present disclosure relates to support fields of displays, and more particularly relates to a display wall mount.

BACKGROUND

Electronic devices such as flat panel televisions, flat panel displays and the like have been widely used because of their high definition, large screen, light weight, and other advantages. Current flat panel television or current flat panel display is generally mounted on a wall through a wall mount, thereby saving space. However, current wall mount does not have an adjusting function and is inconvenient to mount. Once the mount is completed, a mounting position can no longer be adjusted, and a position and a viewing angle of the flat panel television cannot be adjusted, which is inconvenient for using.

SUMMARY

The purpose of the present disclosure is to provide a display wall mount which has an adjusting function.

To solve above technical problems, the present disclosure discloses a display wall mount, configured to mount a display on a wall. The display wall mount includes a first connecting mechanism, an intermediate connecting mechanism and a second connecting mechanism. The first connecting mechanism is coupled to the wall. The first connecting mechanism includes a wall plate coupled to the wall, and a connecting frame capable of sliding relative to the wall plate. The second connecting mechanism is coupled to the display. One end of the intermediate connecting mechanism is rotatablely coupled to the connecting frame, and one end of the intermediate connecting mechanism away from the first connecting mechanism is rotatablely coupled to the second connecting mechanism.

The first connecting mechanism of the display wall mount provided by the present disclosure is coupled to the wall. The second connecting mechanism is coupled to the display. One end of the intermediate connecting mechanism is rotatablely coupled to the connecting frame, and the other end of the intermediate connecting mechanism is rotatablely coupled to the second connecting mechanism. Therefore, a mounting position of the display can be adjusted along with a slide of the connecting frame, and it is convenient to mount. A viewing angle of the display mounted on the display wall mount can also be adjusted through the first connecting mechanism, the intermediate connecting mechanism, and the second connecting mechanism, which is convenient for using.

BRIEF DESCRIPTION OF THE ACCOMPANYING DRAWINGS

To describe the technology solutions in the embodiments of the present disclosure more clearly, the following briefly introduces the accompanying drawings required for describing the embodiments. Obviously, the accompanying drawings in the following description show merely some embodiments of the present disclosure, those of ordinary skilled in the art may also obtain other drawings based on these drawings without any creative efforts.

DETAILED DESCRIPTION OF ILLUSTRATED EMBODIMENTS

The technology solutions in the embodiments of the present disclosure will be described clearly and completely hereinafter with reference to the accompanying drawings in the embodiments of the present disclosure. Obviously, the described embodiments are merely some but not all embodiments of the present disclosure. All other embodiments obtained by a person of ordinary skilled in the art based on the embodiments of the present disclosure without creative efforts shall fall within the protection scope of the present disclosure.

Figure 1:
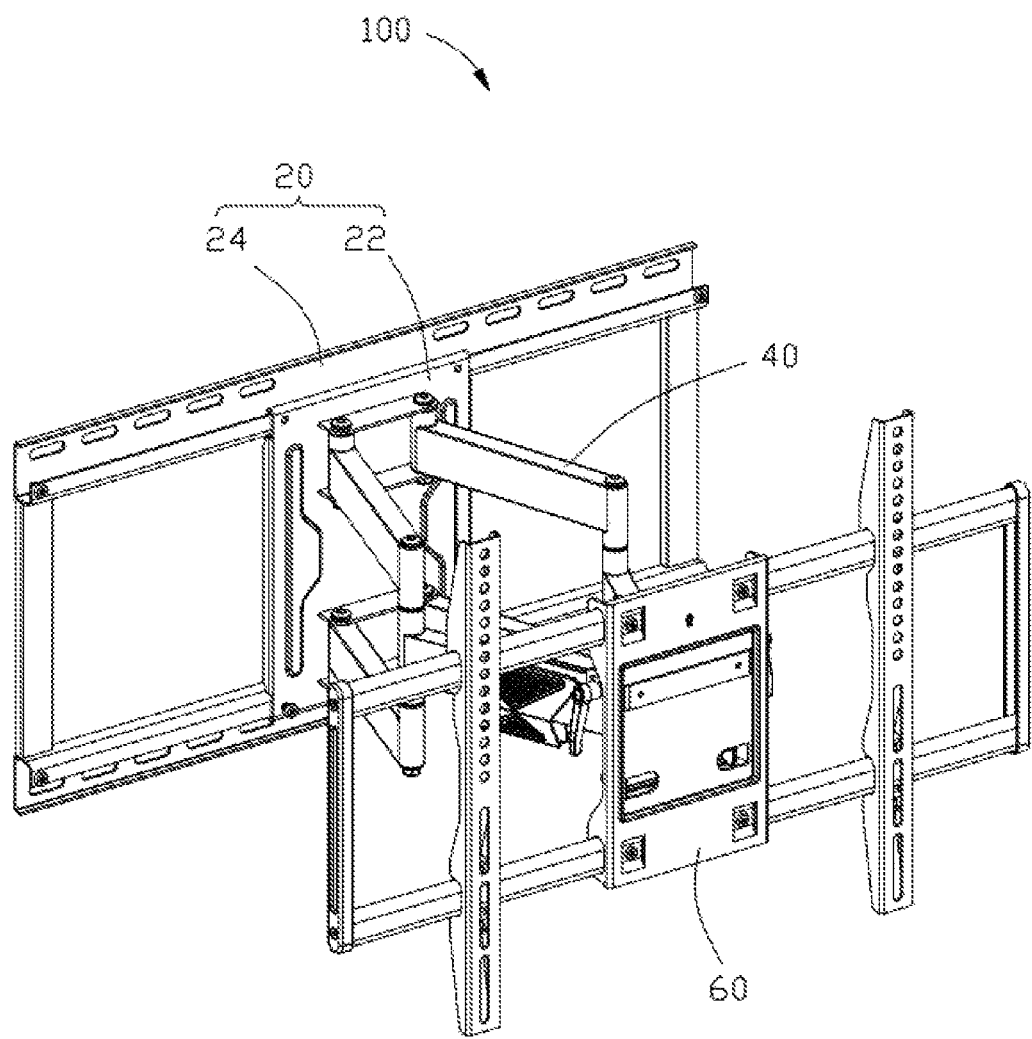
FIG. 1 is a diagram of a three-dimensional structure of a display wall mount provided by a first embodiment of the present disclosure.
Figure 2:
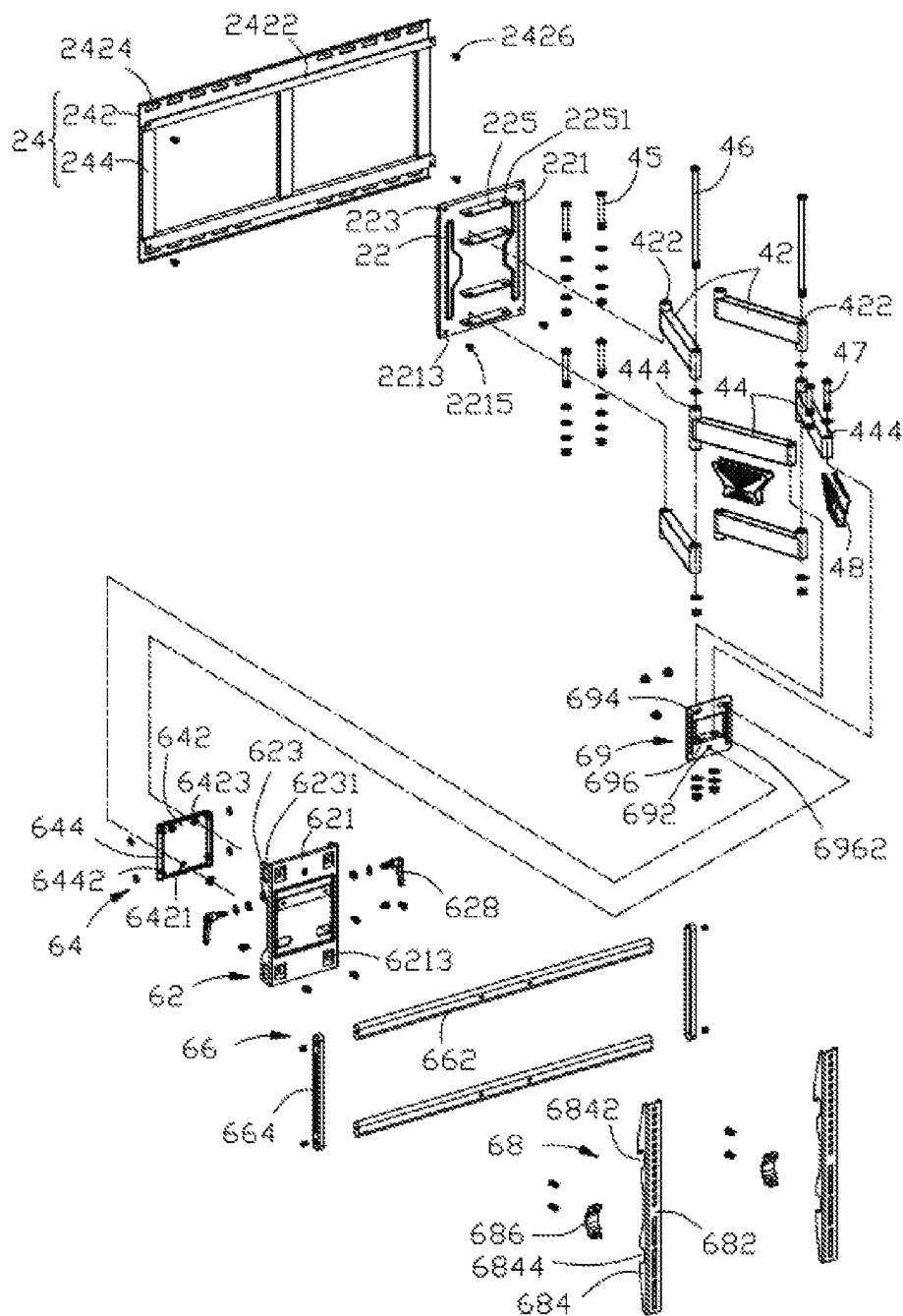
FIG. 2 is an exploded diagram of a three-dimensional structure of the display wall mount shown in FIG. 1.

Referring to FIGS. 1 and 2, FIG. 1 is a diagram of a three-dimensional structure of a display wall mount provided by a first embodiment of the present disclosure. FIG. 2 is an exploded diagram of a three-dimensional structure of the display wall mount shown in FIG. 1. The present disclosure provides a display wall mount 100 configured to mount a display on a wall. The display wall mount 100 includes a first connecting mechanism 20, an intermediate connecting mechanism 40 and a second connecting mechanism 60. The first connecting mechanism 20 is coupled to the wall. The first connecting mechanism 20 includes a connecting frame capable of sliding relative to the wall. The second connecting mechanism 60 is coupled to the display. A back end of the intermediate connecting mechanism 40 is rotatablely coupled to the connecting frame 22, and one end of the intermediate connecting mechanism 40 away from the first connecting mechanism 20 is rotatablely coupled to the second connecting mechanism 60. That is, a front end of the intermediate connecting mechanism 40 is rotatablely coupled to the second connecting mechanism 60.

In this embodiment, the front end of the intermediate connecting mechanism 40 refers to an end away from the wall, and the hack end of the intermediate connecting mechanism 40 refers to an end facing the wall.

The display may be an electronic device such as a flat panel television or a flat panel display. In this embodiment, the display is a flat panel television.

The first connecting mechanism 20 of the display wall mount 100 provided by the present disclosure is coupled to the wall. The second connecting mechanism 60 is coupled to the display. The back end of the intermediate connecting mechanism 40 is rotatably coupled to the connecting frame 22 of the first connecting mechanism 20. The front end of the intermediate connecting mechanism 40 is rotatably coupled to the second connecting mechanism 60. Therefore, a mounting position of the display can be adjusted along with a slide of the connecting frame 22, and it is convenient to mount. A viewing angle of the display mounted on the display wall mount 100 can also be adjusted through the first connecting mechanism 20, the intermediate connecting mechanism 40, and the second connecting mechanism 60, which is convenient for using.

Figure 3:
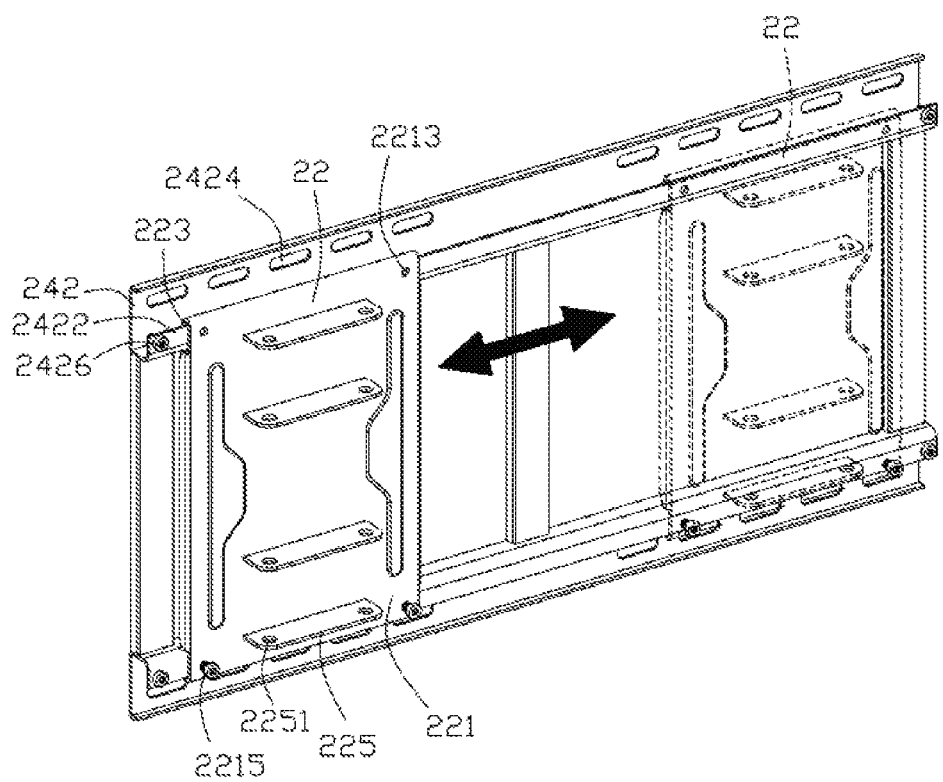
FIG. 3 is a diagram of a structure of a first connecting mechanism of the display wall mount provided by a first embodiment of the present disclosure.

Referring to FIGS. 2 and 3, FIG. 3 is a diagram of a structure of a first connecting mechanism of the display wall mount provided by a first embodiment of the present disclosure. The first connecting mechanism 20 further includes a wall plate 24. The connecting frame 22 is slidably coupled to the wall plate 24 along a longitudinal direction of the wall plate 24. The wall plate 24 includes two guides 242 spaced in parallel and reinforcement rods 244 coupled between the two guides 242. Each guide 242 includes a guiding bar 2422 located along its length. The guiding bar 2422 extends toward one side far away from the wall firstly and then bends and extends along a direction away from the other guide 242. That is, the guiding bar 2422 has an L-shaped cross section. The guide 242 defines a plurality of connecting roles 2424 along a longitudinal direction of a side wall of the guiding bar 2422 facing the guiding bar 2422. Each connecting role 2424 is a bar-shaped hole. The bar-shaped hole extends along the length of the guide 242. The opposite ends of each guiding bar 2422 each includes a stopping portion 2426, which can prevent sliding bars 223 from coming off the guiding bar 2422. That is, the stopping portion 2426 can prevent the connecting frame 22 from coming off the guiding bar 2422.

In this embodiment, the stopping portion 2426 is a screw bolted to the guiding bar 2422.

The connecting frame 22 includes a sliding plate 221, two sliding bars 223 respectively located on top and bottom ends of the sliding plate 221, and two sets of connecting plates 225 protruding from the sliding plate 221 and away from the two sliding bars 223. Each sliding bar 223 is a hook body extending from the sliding plate 221 to a side away from the connecting plate 225. Each set of connecting plates 225 includes two connecting plates that are relatively spaced apart, and two ends of each connecting plate each defines a connecting role 2251. The two sliding bars 223 can be slidably engaged with the guiding bars 2422 of the two guides 242 respectively. The sliding plate 221 defines at least one positioning hole 2213. At least one positioning member 2215 is provided for passing through the at least one positioning hole 2213 respectively, causing the connecting frame 22 to be positioned on the wall plate 24.

In this embodiment, the sliding plate 221 defines four positioning holes 2213. The four positioning holes 2213 are respectively defined at four corners of the sliding plate 221. And each positioning hole 2213 faces one corresponding sliding bar 223. Each positioning hole 2213 is a screw hole. The positioning member 2215 is a locking screw that can abut on the corresponding guiding bar 2422 through the corresponding positioning hole 2213.

In other embodiments, only one guide 242 may be located on the wall plate 24. At least one guiding bar 2422 is located along a longitudinal direction of the guide 242. The connecting frame 22 may include at least one sliding bar 223 corresponding to the at least one guiding bar 2422. The at least one sliding bar 223 can slide along the at least one guiding bar 2422.

The intermediate connecting mechanism 40 includes two pairs of first support arms 42 and two second support arms 44 each is rotatably coupled to one pair of the first support arms 42. One end of each first support arm 42 away from the second support arm 44 is rotatably coupled to the connecting frame 22, and one end of each second support arm 44 away from the first support arm 42 is rotatablely coupled to the second connecting mechanism 60. Two opposite ends of each first support arm 42 each defines a through hole 422 along a direction perpendicular to a sliding direction of the connecting frame 22. That is, each through hole 422 extends along a direction perpendicular to a longitudinal direction of the first support arm 42. Opposite ends of each second support arm 44 each defines a through hole 444 along a direction perpendicular to the sliding direction of the connecting frame 22. That is, each through hole 444 extends in a direction perpendicular to the longitudinal direction of the second support arm 44.

The intermediate connecting mechanism 40 also includes four first arm threaded rods 45, two second arm threaded rods 46, two head threaded rods 47, two cable grooves 48, a plurality of spacers, and a plurality of nuts. The first arm threaded rods 45 are configured for coupling the first support arms 42 with the connecting frame 22. The second arm threaded rods 46 are configured for coupling the first support arms 42 with the corresponding second support arms 44. The head threaded rods 47 are configured for coupling the second support arms 44 with the second connecting mechanism 60. The two cable grooves 48 each is clamped to one of the two second support arms 44 for positioning cables coupled to the display, and strengthening the second support arm 44. Alternatively, the two cable grooves 48 can also be clamped to the first support arms 42.

Figure 4:
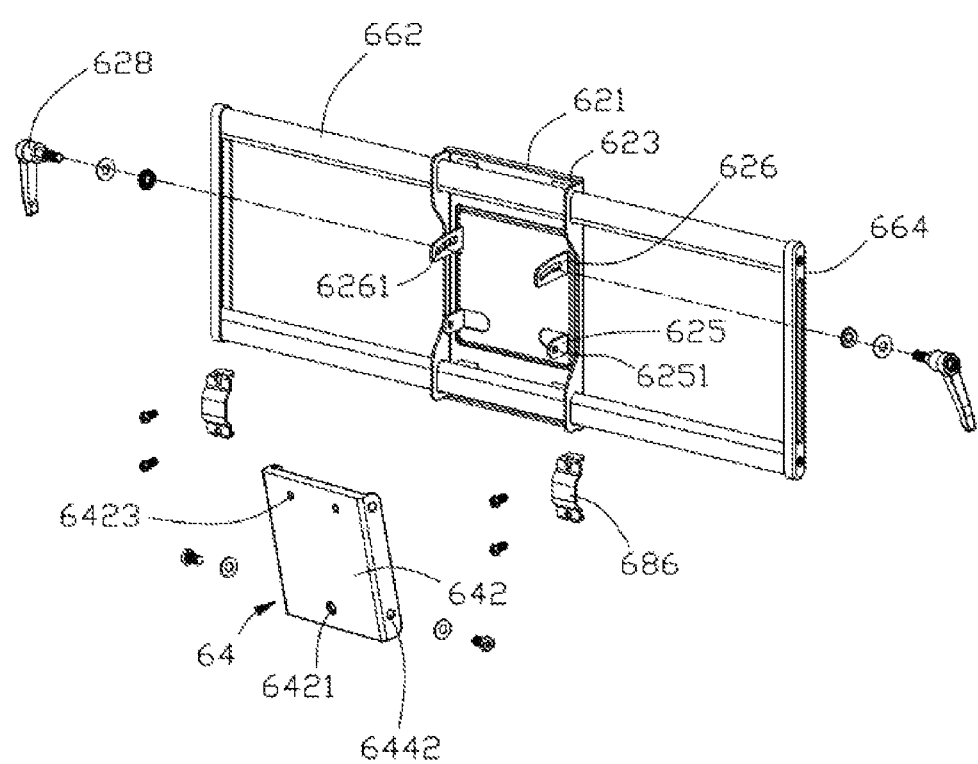
FIG. 4 is a diagram of a structure of a second connecting mechanism of the display wall mount provided by a first embodiment of the present disclosure.
Figure 5:
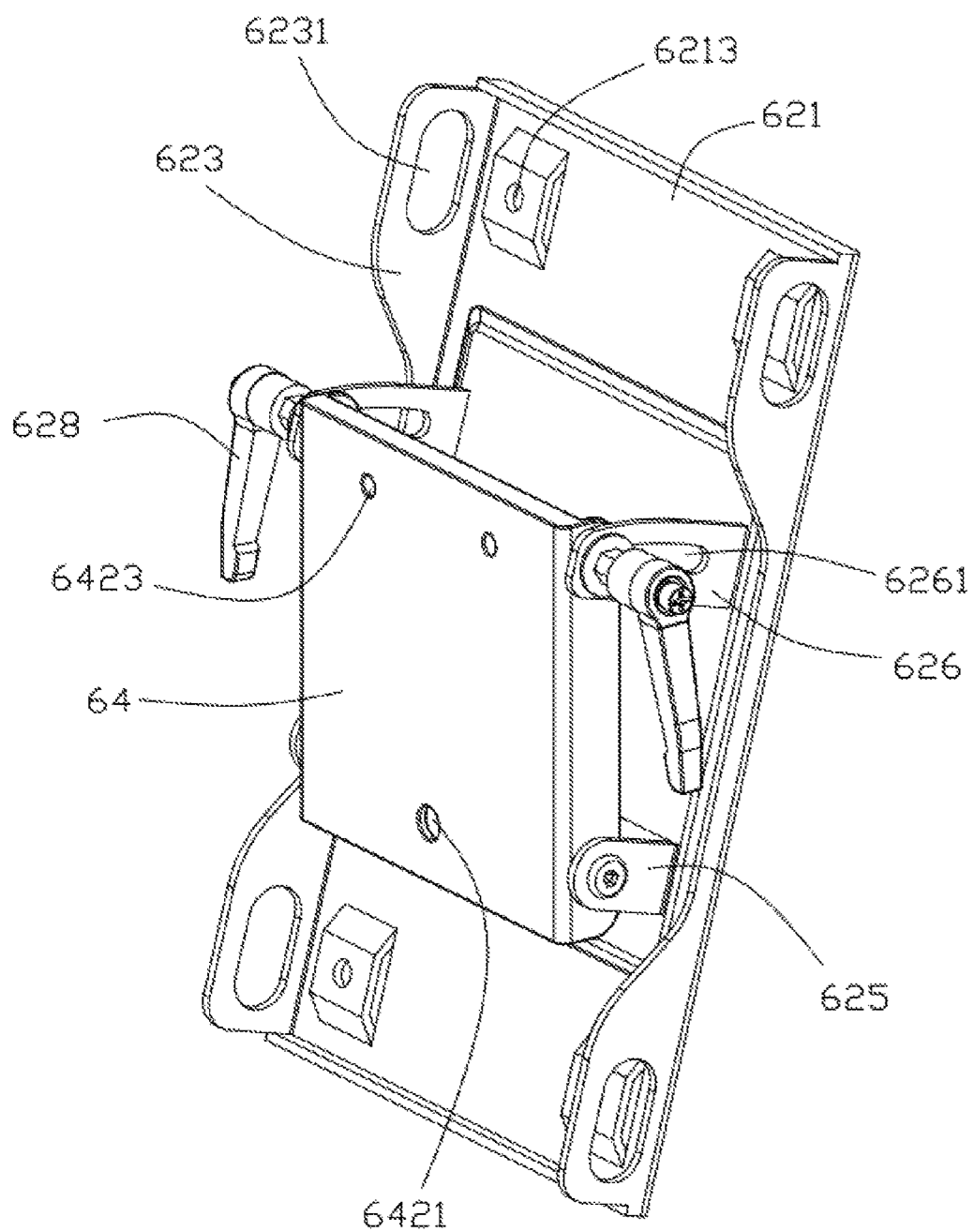
FIG. 5 is a diagram of partial assembling for the second connecting mechanism shown in FIG. 4.

Referring to FIG. 2, FIG. 4 and FIG. 5, FIG. 4 is a diagram of a structure of a second connecting mechanism of the display wall mount provided by a first embodiment of the present disclosure; FIG. 5 is a diagram of partial assembling for the second connecting mechanism shown in FIG. 4. The second connecting mechanism 60 includes a first adjustment plate 62, a second adjustment plate 64, a support frame 66, two positioning frames 68, and a connecting member 69. The support frame 66 and the two positioning frames 68 are combined into a display wall bracket.

The first adjustment plate 62 includes a mounting plate 621, two flanges 623 extending from two opposite sides of the mounting plate 621 toward a same side, a pair of first lugs 625 and a pair of second lugs 626 spaced from the pair of the first lugs 625. The first lug 625, the second lug 626 and the flanges 623 are located on the same side of the mounting plate 621. Two engaging holes 6231 are respectively defined on upper and lower ends of each flange 623, and a plurality of locating holes 6213 are defined on the mounting plate 621 and each is adjacent to one corresponding engaging hole 6231. The pair of the first lugs 625 and the pair of the second lugs 626 are located in a middle of the mounting plate 621, and the first lugs 625 are located at below the second lugs 626. The pair of the first lugs 625 each defines a shaft hole 6251 along the sliding direction of the connecting frame 22. The pair of the second lugs 626 each defines a first arc groove 6261. The first arc groove 6261 extends centered on an axis line of the shaft 6251. The first adjustment plate 62 further includes two adjustment handles 628. Each adjustment handle 628 includes a screw for coupling the first adjustment plate 62 and the second adjustment plate 64.

The second adjustment plate 64 includes a connecting plate 642, and two flanges 644 protruding from opposite sides of the connecting plate 642 toward the first adjustment plate 62. A rotating hole 6421 is formed in a middle of a bottom of the connecting plate 642. Two connecting roles 6423 are formed on two sides of a top of the connecting plate 642. The top and bottom of each flange 644 each defines a connecting role 6442.

The support frame 66 includes two support bars 662 spaced apart, and two support sleeves 664 each attached to same ends of the two support bars 662. The two support bars 662 are respectively inserted into corresponding engaging holes 6231 of the first adjustment plate 62.

Each positioning frame 68 includes a connecting bar 682 for fixing on the display, two flanges 684 protruding from opposite sides of the connecting bar 682 and extending towards the same side, and a clip 686. A pair of hanging holes 6842 are formed on the top of the two flanges 684 respectively, and a pair of positioning ports 6844 are formed on the bottom of the two flanges 684 respectively.

A rotating hole 692 is defined in a middle of a bottom of the connecting member 69, and two second arc grooves 694 are respectively formed on two sides of a top of the connecting member 69. The two second arc grooves 694 extend centered on an axis line of the rotating hole 692. A protrusion 696 protrudes outward from a middle of the connecting member 69. The protrusion 696 extends along a direction parallel to the sliding direction parallel of the connecting frame 22. Two opposite ends of the protrusion 696 each defines a connecting hole 6696. The connecting hole 6962 extends along a direction perpendicular to the sliding direction of the connecting frame 22. That is, the connecting hole 6962 extends along a direction parallel to an axis line between the first support arm 42 and the connecting frame 22.

When the second connecting mechanism 60 is assembled, one side of the connecting member 69 facing the protrusion 696 is attached to the connecting plate 642 of the second adjustment plate 64, and a screw is provided to pass through the rotating hole 692 of the connecting member 69, the rotating hole 6421 of the connecting plate 642, and the spacer and then is screwed with nuts so that the connecting member 69 and the second adjustment plate 64 can rotate along the screw. Two screws respectively pass through the two second arc grooves 694 of the connecting member 69, the two connecting role 6423 and the two spacer, and then are screwed with two nuts so that the top of the second adjustment plate 64 can slide along the second arc groove 694. The second adjustment plate 64 is received between the first lugs 625 and the second lugs 626 of the first adjustment plate 62, so that the connecting member 69 on the second adjustment plate 64 faces away from the mounting plate 621 of the first adjustment plate 62, and the connecting roles 6442 of the second adjustment plate 64 correspond to the shaft holes 6251 and the first arc grooves 6261, respectively. Two screws pass through the two shaft holes 6251, the connecting roles 6442, and the spacers respectively and are screwed to two nuts. Screws of the two adjusting handles 628 each passes through the two spacer, the two first arc grooves 6261 and the two corresponding connecting roles 6442, and then is screwed to nuts. At this time, the bottom of the second adjustment plate 64 can rotate along the axis line of the shaft hole 6251, and the top of the second adjustment plate 64 can slide along the first arc grooves 6261. The two support bars 662 are respectively inserted into the corresponding engaging holes 6231 on the first adjustment plate 62. The two support sleeves 664 are coupled to both ends of the two support bars 662. A plurality of screws respectively pass through the corresponding locating holes 6213 to be locked on the corresponding support bars 662.

Figure 6:
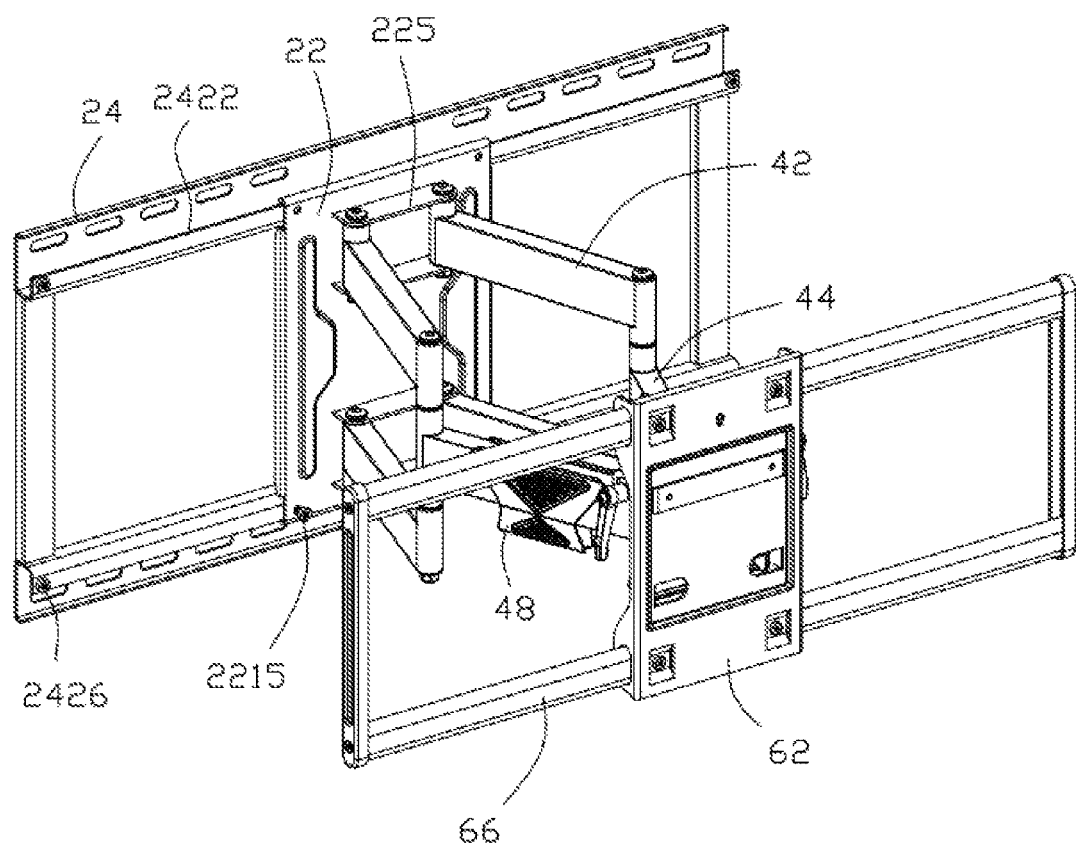
FIG. 6 is a diagram of partial assembling for the display wall mount shown in FIG. 2.

Referring to FIG. 6, FIG. 6 is a diagram of assembling for the display wall mount shown in FIG. 2. During assembly, the ends of the two second support arms 44 are respectively clamped to the ends of two pairs of the first support arm 42, and the two second arm threaded rods 46 are respectively threaded in the through holes 422, the connecting holes 444 and the spacers, and then screwed to the nuts. At this time, each second support arm 44 and the corresponding pair of first support arms 42 can rotate. The ends of the two pairs of the first support arms 42 away from the corresponding second support arms 44 are respectively accommodated between the two sets of the connecting plates 225. A plurality of first arm threaded rods 45 each passes through the corresponding connecting role 2251, the through hole 422, and the spacer, and then are screwed to the nuts. In this case, each pair of first support arms 42 is rotatablely coupled to the connecting frame 22. The connecting holes 444 of the two second support arms 44 away from the first support arms 42 respectively face the two connecting holes 6696 on the connecting member 69. The two head screws 47 respectively pass through the two connecting holes 444, the corresponding two connecting holes 6962 and the spacer, and then are screwed to the nuts, so that the second connecting mechanism 60 is coupled to the intermediate connecting mechanism 40. At this time, each second support arm 44 is rotatablely coupled to the connecting member 69. The sliding bars 223 of the connecting frame 22 are respectively engaged with the guiding bars 2422 of the guide 242 so that the connecting frame 22 can slide along the guide 242. Then, the two cable grooves 48 are respectively clamped on the two second support arms 44.

Figure 7:
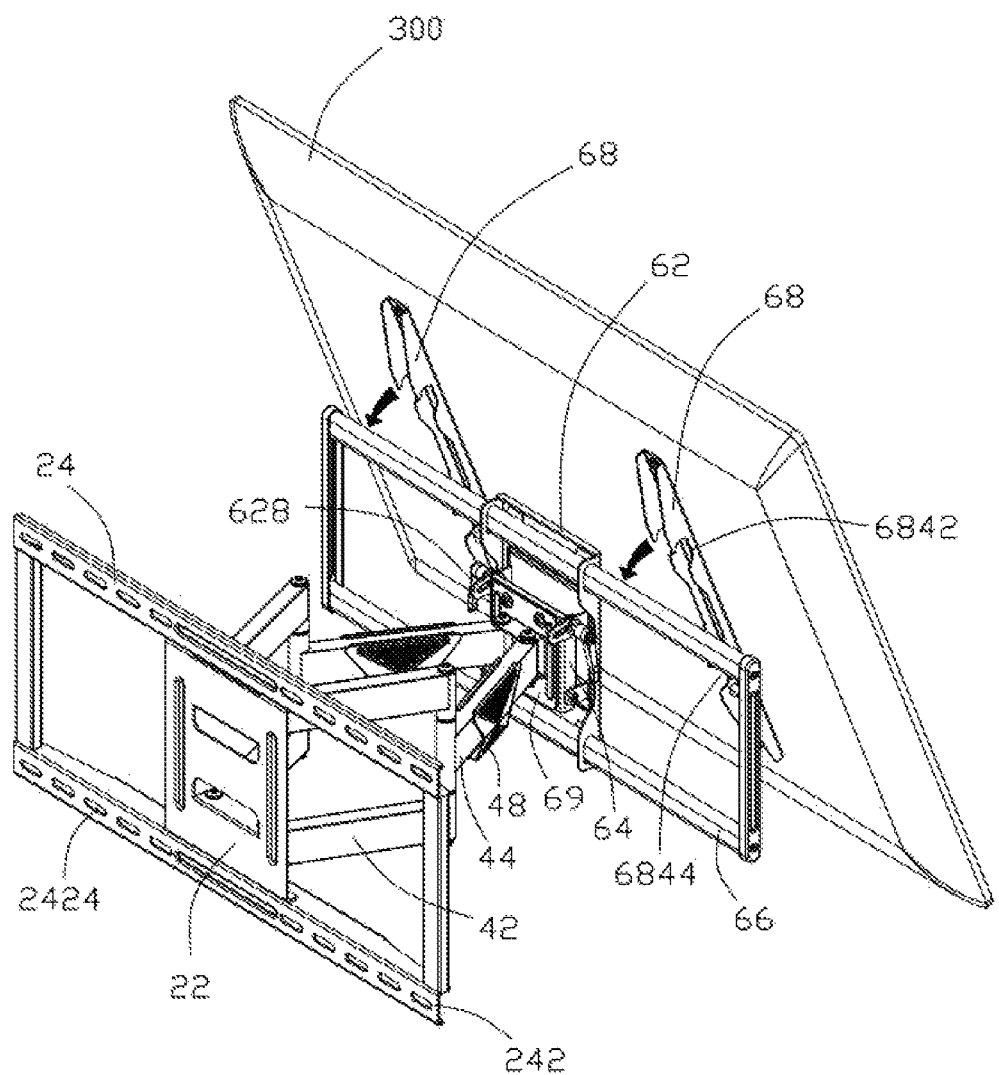
FIG. 7 to FIG. 8 are diagrams of a process of displaying a display on a display wall mount provided by a first embodiment of the present disclosure.
Figure 8:
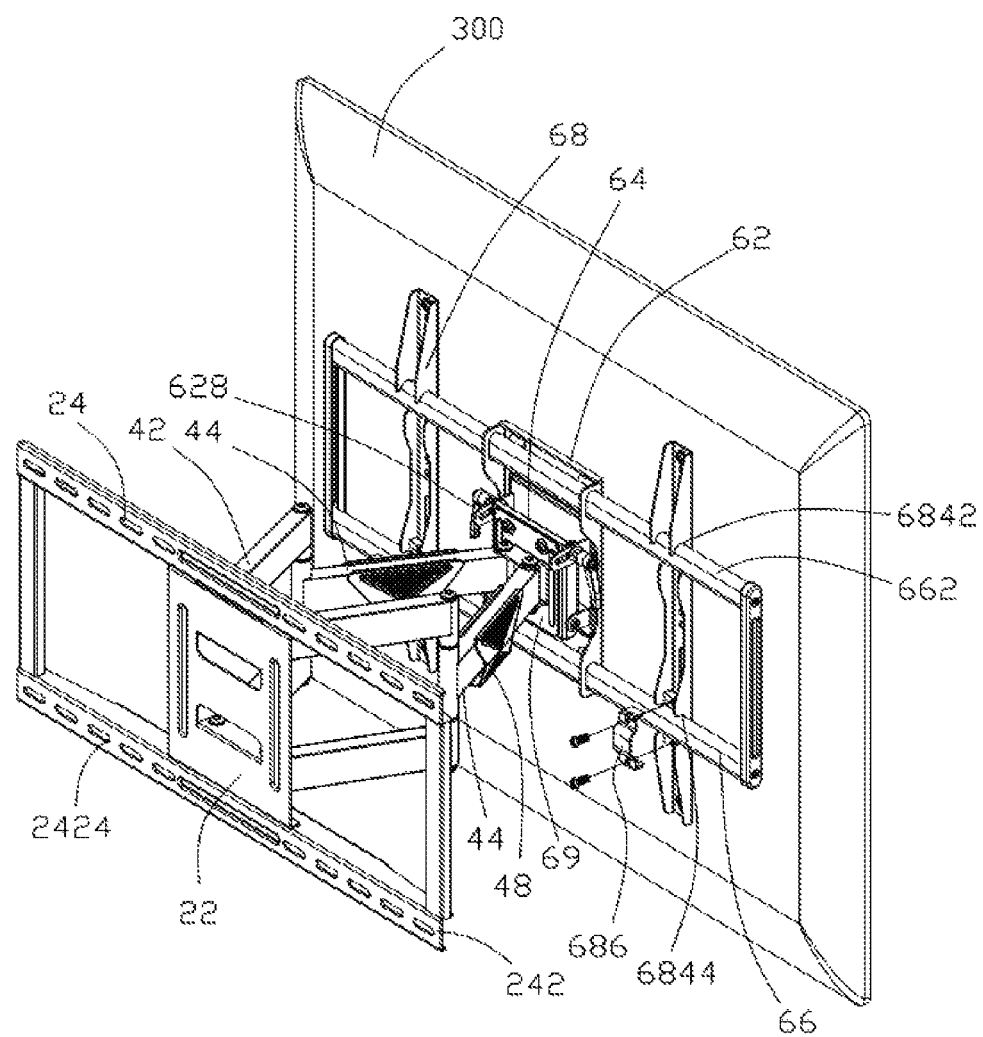
Figure 9:
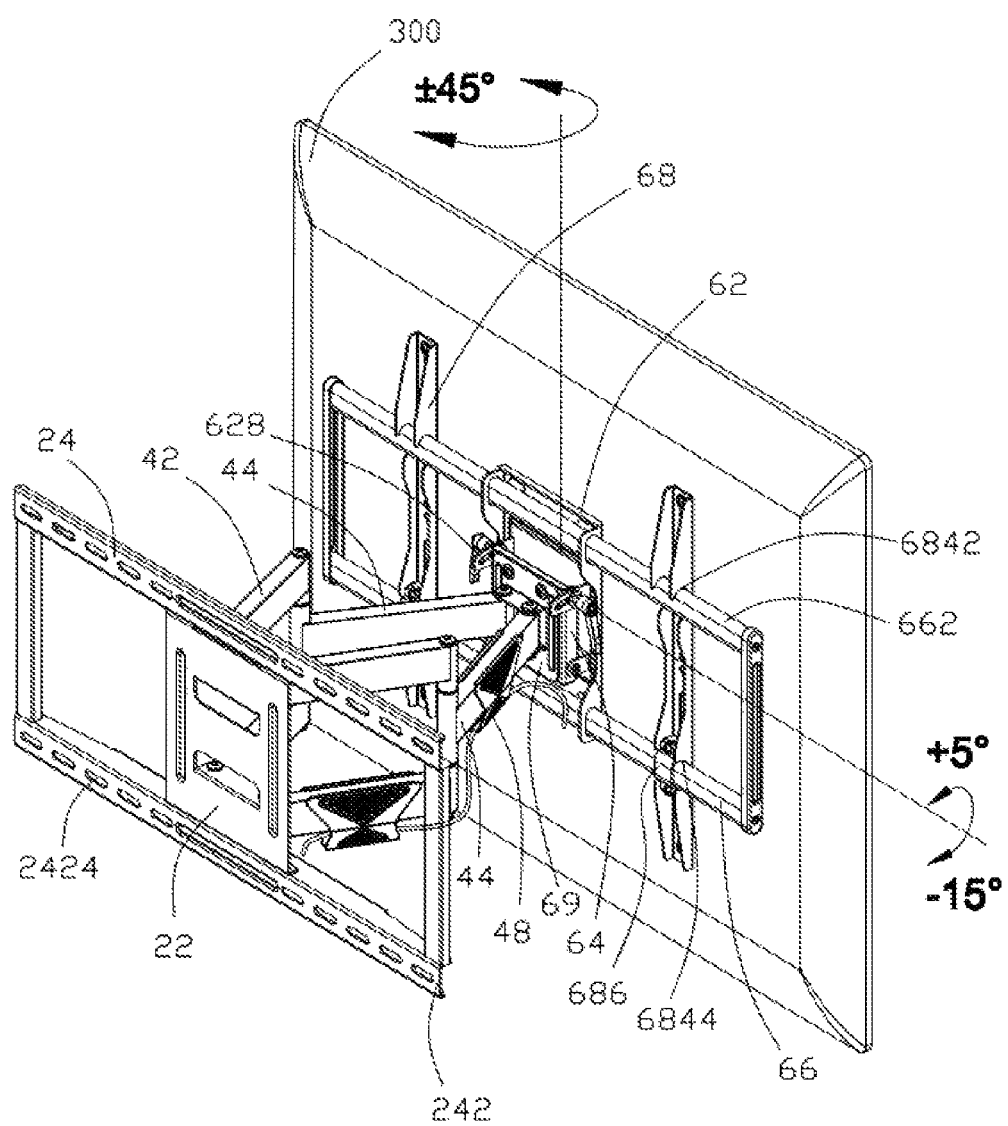
FIG. 9 is a diagram of a use state of a display wall mount provided by the first embodiment of the present disclosure.

Referring to FIG. 7 to FIG. 9, FIG. 7 to FIG. 8 are diagrams of a process of displaying a display on a display wall mount provided by a first embodiment of the present disclosure. FIG. 9 is a diagram of a use state of a display wall mount provided by the first embodiment of the present disclosure, in use, a plurality of screws are fastened to the wall through the connecting role 2424 of the two guides 242 of the wall plate 24 so that the wall plate 24 is fixed to the wall in a horizontal direction. The two positioning frames 68 are fixed to a back of the display 300 at intervals, so that the two corresponding hanging holes 6842 on the positioning frame 68 correspond, and locate on a top of the display 300. The positioning port 6844 on the positioning member 68 corresponds, and locate on a bottom of the display 300. The hanging holes 6842 of the two positioning frames 68 on the back of the display 300 are hung on the support bar 662 at the top of the support frame 66, and the support bar 662 at the bottom of the support frame 66 is accommodated in the positioning port 6844, and the two clips 686 are respectively wrapped and fixed in the two corresponding positioning frames 68.

At this time, the axis line between the bottom of the first adjustment plate 62 and the second adjustment plate 64 is parallel to the sliding direction of the connecting frame 22. That is, the axis line is a center line of the pair of shaft holes 6251 of the first adjustment plate 62. The bottom of the first adjustment plate 62 may be rotated along the axis line, and the top of the first adjustment plate 62 may slide along the first arc grooves 6261, so that the display 300 can be lowered or raised. In this embodiment, a rotating angle that the display 300 rotates along the center line of the shaft hole 6251 is between +5° and −15°. The axis line between the bottom of the second adjustment plate 64 and the bottom of the connecting member 69 is perpendicular to the sliding direction of the connecting frame 22. That is, the axis line is a center line of the rotating hole 692 of the connecting member 69. The bottom of the second adjustment plate 64 can rotate along the axis line, and the top of the second adjustment plate 64 can slide along the second arc groove 694 so that the display 300 can rotate on a plane parallel to a light exit surface of the display 300. In this embodiment, the rotating angle of the display 300 is between +3° and −3°. The axis line between each first support arm 42 and the corresponding second support arm 44, the axis line between each first support arm 42 and the connecting frame 22, and the axis line between each second support arm 44 and the connecting member 69 are parallel to each other and are perpendicular to the sliding direction of the connecting frame 22, that is, the axis lines extend along the top and bottom direction of the wall. Therefore, the display 300 may be away from or adjacent to the wall, the display 300 may be translated to left or right, and the display 300 may be rotated to left or right. In this embodiment, the angle of the display 300 turning to the left or right is between +45° and −45°.

The connecting frame 22 of the display wall mount 100 of the present disclosure is slidably coupled to the wall plate 24. Therefore, the position of the connecting frame 22 can be conveniently moved, and the positioning can be facilitated by the positioning member 2215. The intermediate connecting mechanism 40 and the second connecting mechanism 60 can be used to couple the display 300 to the connecting frame 22, so that the display 300 can be moved forward and backward, moved right and left, rotated left and right, lowered or raised, and the like, and the viewing angle of the display 300 can be easily adjusted.

Figure 10:
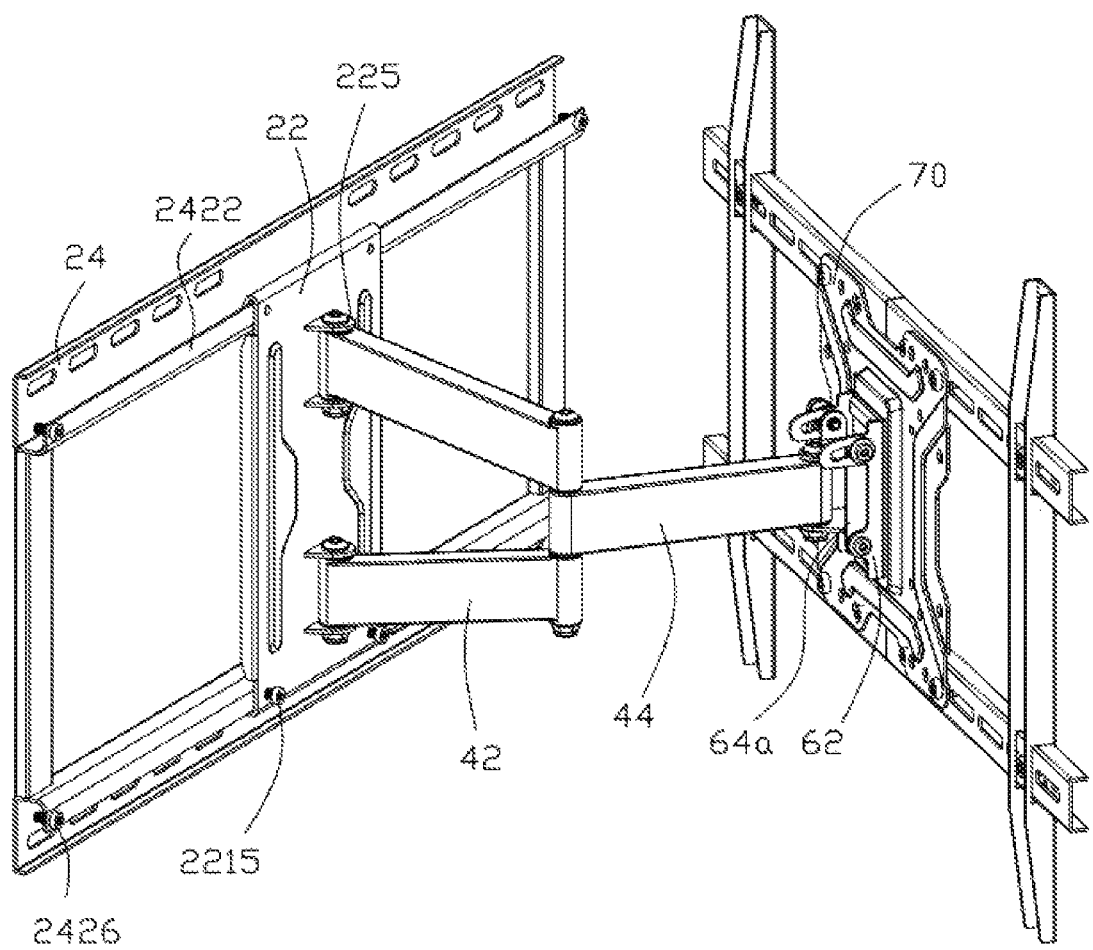
FIG. 10 is a diagram of a three-dimensional structure of a display wall mount provided by a second embodiment of the present disclosure.

Please refer to FIG. 10, FIG. 10 is a schematic diagram of a three-dimensional structure of a display wall mount provided by a second embodiment of the present disclosure. The structure of the display wall mount provided by the second embodiment of the present disclosure is similar to the structure of the display wall mount provided by the first embodiment. The difference lies in that the display wall mount of the second embodiment only includes a pair of first support arms 42 and a second support arm 44. One end of the second support arm 44 is rotatablely clamped between the pair of the first support arms 42, and one end of the second support arm 44 away from the first support arm 42 is coupled to the first adjustment plate 62 through a second adjustment plate 64*a*. A side of the first adjustment plate 62 away from the second adjustment plate 64*a* is detachably coupled to a display wall bracket 70. During assembly, the wall plate 24 is fixed on the wall in a horizontal direction, the display wall bracket 70 is mounted on a back of the display, and the display wall bracket 70 is clamped on the first adjustment plate 62. The connecting frame 22 in the second embodiment of the present disclosure can slide along the wall plate 24 so that the position of the connecting frame 22 can be conveniently moved, and the positioning can be performed through the positioning member 2215 to facilitate adjustment of the mounting position of the display. In addition, the display is coupled to the connecting frame 22 through the first support arm 42, the second support arm 44, the first adjustment plate 62, and the second adjustment plate 64*a*, so that the display 300 can be moved forward and backward, moved right and left, rotated left and right, lowered or raised, and the like, and the viewing angle of the display 300 can be easily adjusted.

Figure 11:
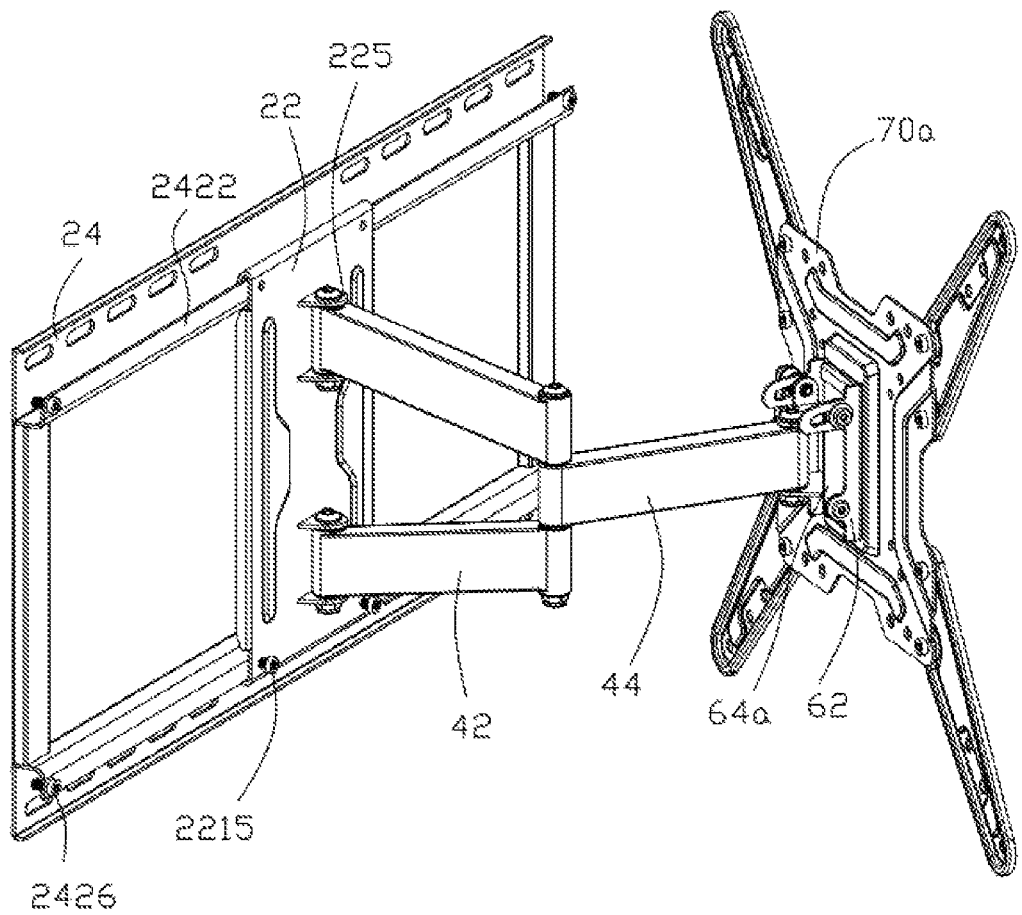
FIG. 11 is a diagram of a three-dimensional structure of a display wall mount provided by a third embodiment of the present disclosure.

Referring to FIG. 11, FIG. 11 is a schematic diagram of a three-dimensional structure of a display wall mount provided by a third embodiment of the present disclosure. The structure of the display wall mount provided by the third embodiment of the present disclosure is similar to the structure of the display wall mount provided by the second embodiment. The difference lies in that the display wall mount 70*a* in the display wall mount of the third embodiment is different from the display wall mount 70 in the display wall mount of the second embodiment. That is, the display wall mount 70*a* of the third embodiment also includes only a pair of the first support arms 42 and a second support arm 44, and one end of the second support arm 44 is rotatablely clamped between the pair of the first support arm 42, and one end of the second support arm 44 away from the first support arms 42 is coupled to the first adjustment plate 62 through a second adjustment plate 64*a*. One end of the first support arms 42 away from the second support arm 44 is rotatablely coupled to the connecting frame 22, and the display wall mounting bracket 70*a* is detachably clamped to one end of the first adjustment plate 62 away from the second adjustment plate 64*a*.

Figure 12:
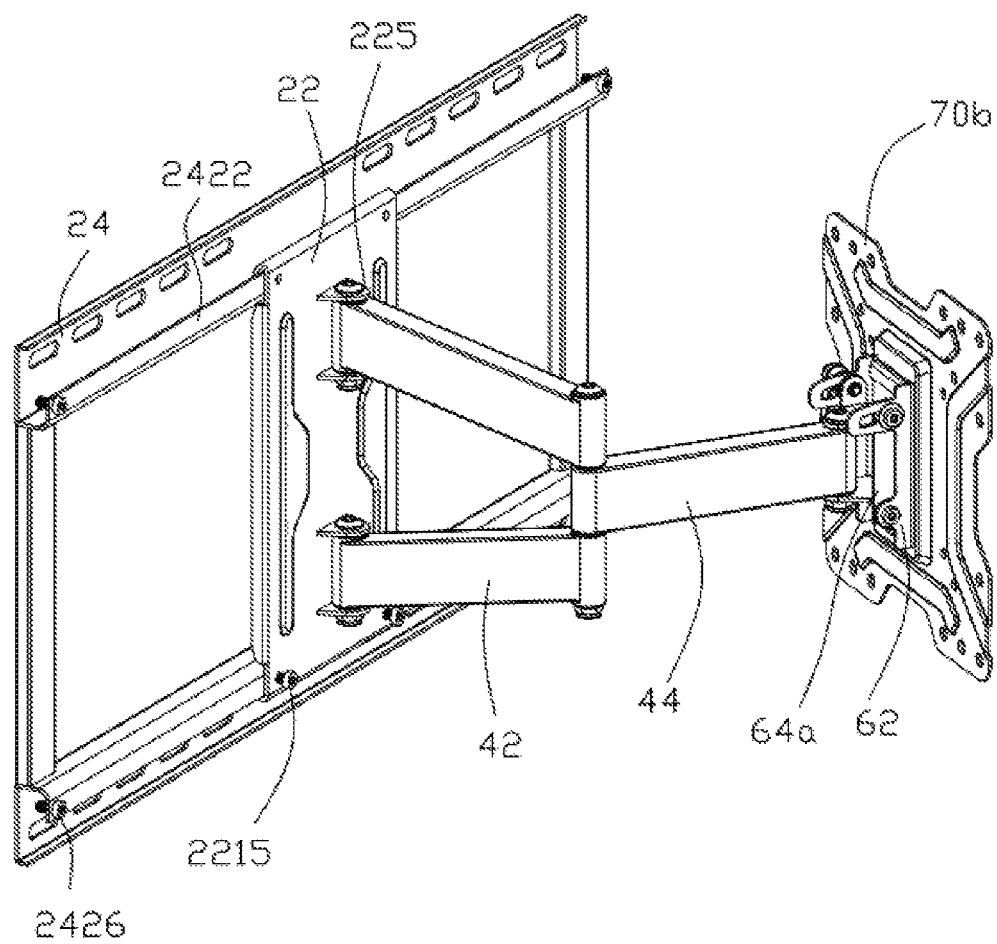
FIG. 12 is a diagram of a three-dimensional structure of a display wall mount provided by a fourth embodiment of the present disclosure.

Referring to FIG. 12, FIG. 12 is a diagram of a three-dimensional structure of a display wall mount provided by a fourth embodiment of the present disclosure. The structure of the display wall mount provided by the fourth embodiment of the present disclosure is similar to the structure of the display wall mount provided by the second embodiment. The difference lies in that the display wall mount 70*b* in the display wall mount of the fourth embodiment is different from the display wall mount 70 in the display wall mount of the second embodiment. That is, the display wall mount 70*b* of the fourth embodiment also includes only a pair of first support arms 42 and a second support arm 44, and one end of the second support arm 44 may be rotatablely clamped between the pair of the first support arm 42 is clamped in the ground, and one end of the second support arm 44 away from the first support arms 42 is coupled to the first adjustment plate 62 through a second adjustment plate 64*a*. One end of the first support arms 42 away from the second support arm 44 is rotatablely coupled to the connecting frame 22, and the display wall bracket 70*b* is detachably clamped to one end of the first adjustment plate 62 away from the second adjustment plate 64*a*.

Figure 13:
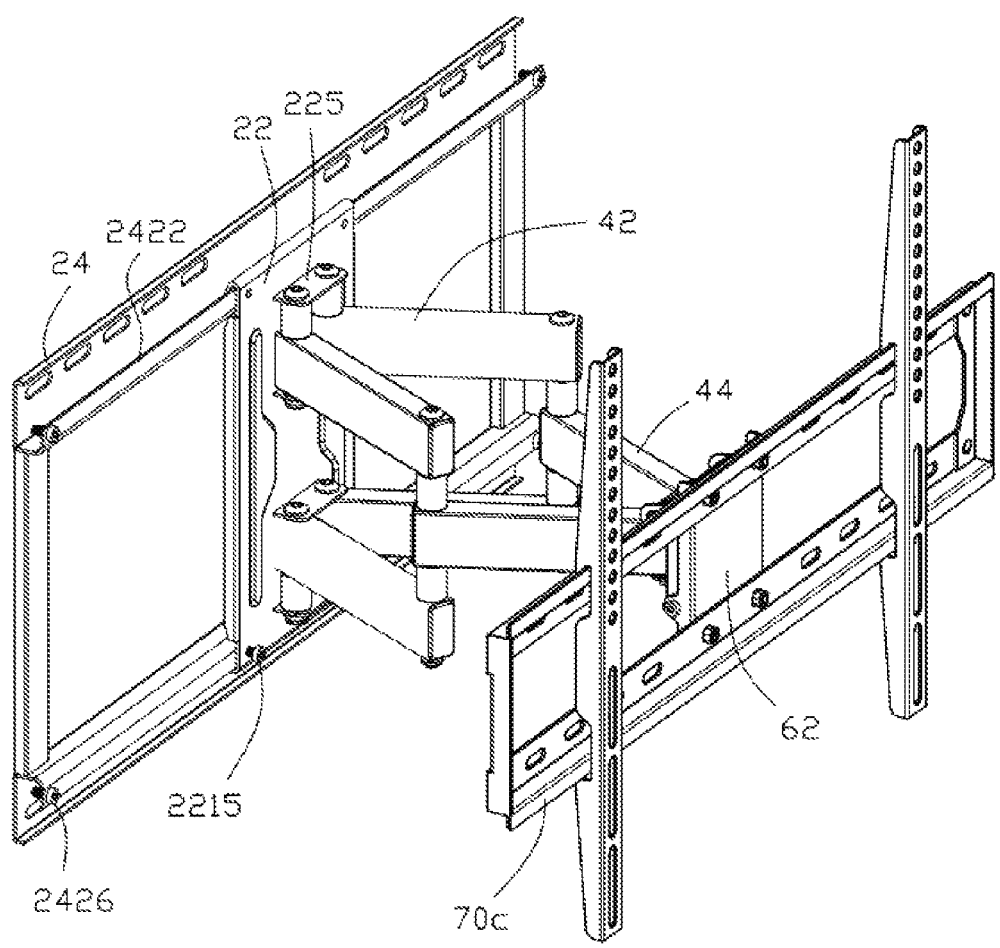
FIG. 13 is a diagram of a three-dimensional structure of a display wall mount provided by a fifth embodiment of the present disclosure.

Referring to FIG. 13, FIG. 13 is a diagram of a three-dimensional structure of a display wall mount provided by a fifth embodiment of the present disclosure. The structure of the display wall mount provided by the fifth embodiment of the present disclosure is similar to the structure of the display wall mount provided by the first embodiment. The difference lies in that: the display wall mount 70*c* in the display wall mount of the fifth embodiment is different from the the display wall bracket combined by the support frame 66 and the positioning frame 68 in the display wall bracket of the first embodiment, and the display wall bracket 70*c* in the fifth embodiment is coupled to the first adjustment plate 62 by screwing.

Figure 14:
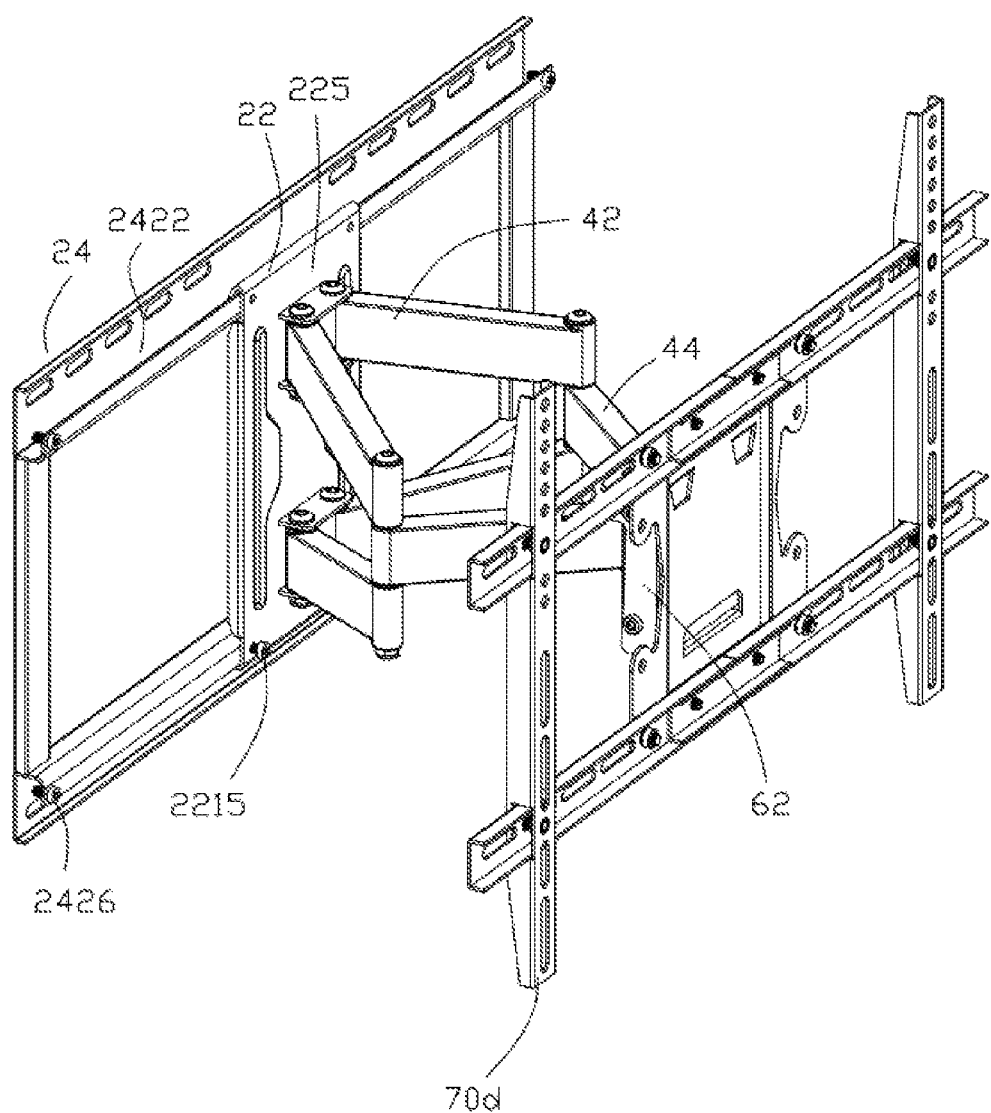
FIG. 14 is a diagram of a three-dimensional structure of a display wall mount provided by a sixth embodiment of the present disclosure.

Referring to FIG. 14, FIG. 14 is a diagram of a three-dimensional structure of a display wall mount provided by a sixth embodiment of the present disclosure. The structure of the display wall mount provided by the sixth embodiment of the present disclosure is similar to the structure of the display wall mount provided by the first embodiment. The difference lies in that: the display wall mount 70*d* in the display wall mount of the sixth embodiment is different from the the display wall bracket combined by the support frame 66 and the positioning frame 68 in the display wall bracket of the first embodiment, and the display wall bracket 70*d* in the sixth embodiment is coupled to the first adjustment plate 62 by a slide plate in a screwed manner.

The display wall mount 100 of the present disclosure can be coupled to the display wall brackets with different types to facilitate mounting of different types of displays, thereby improving the versatility of the display wall mount 100.

The above are embodiments of the present disclosure, and it should be noted that those skilled in the art may make some improvements and modifications without departing from the principle of the present disclosure, and these improvements and modifications are also the protection scope of the present disclosure.

What is claimed is:

1. A display wall mount, configured for mounting a display on a wall, wherein the display wall mount comprises a first connecting mechanism, an intermediate connecting mechanism, and a second connecting mechanism, and the first connecting mechanism is coupled to the wall, the first connecting mechanism comprises a wall plate coupled to the wall, and a connecting frame sliding relative to the wall plate, the second connecting mechanism is coupled to the display, and one end of the intermediate connecting mechanism is rotatably coupled to the connecting frame, and one end of the intermediate connecting mechanism away from the first connecting mechanism is rotatably coupled to the second connecting mechanism; the wall plate comprises two guides spaced in parallel and reinforcement rods coupled between the two guides; each guide comprises a guiding bar located along a longitudinal direction thereof, the guiding bar extends toward one side far away from the wall firstly and then bends and extends along a direction away from the other guide; the connecting frame comprises two sliding bars each corresponding to one guiding bar, the two sliding bars are slidably engaged with the two guiding bar.

2. The display wall mount according to claim 1, wherein the connecting frame comprises a plurality of connecting plates extending along a sliding direction of the connecting frame, and the connecting frame is coupled to the intermediate connecting mechanism through the plurality of connecting plates.

3. The display wall mount according to claim 1, wherein two ends of each guiding bar each comprises a stopping portion, and the stopping portion prevents the at least one sliding bar from being disengaged from the at least one guiding bar.

4. The display wall mount according to claim 2, wherein the connecting frame comprises at least one positioning member, and the at least one positioning member is configured to position the connecting frame on the wall plate.

5. The display wall mount according to claim 2, wherein the intermediate connecting mechanism comprises at least one first support arm and at least one second support arm rotatablely coupled to the at least one first support arm, and one end of the first support arm away from the second support arm is rotatablely coupled to the connecting frame, and one end of the second support arm away from the first support arm is rotatablely coupled to the second connecting mechanism.

6. The display wall mount according to claim 5, wherein an axis line between the at least one first support arm and the at least one second support arm, and an axis line between the at least one first support arm and the connecting frame, and an axis line between the at least one second support arm and the second connecting mechanism are parallel to each other and are all perpendicular to the sliding direction of the connecting frame.

7. The display wall mount according to claim 5, wherein the second connecting mechanism comprises a first adjustment plate and a second adjustment plate, and a bottom of the second adjustment plate is rotatablely coupled to the first adjustment plate, a top of the adjustment plate is slidably coupled to a top of the first adjustment plate, the first adjustment plate is coupled to the display, the second adjustment plate is coupled to the end of the second support arm away from the first support arm.

8. The display wall mount according to claim 7, wherein the axis line between the bottom of the first adjustment plate and the second adjustment plate is parallel to the sliding direction of the connecting frame.

9. The display wall mount according to claim 8, wherein the first adjustment plate defines at least one first arc groove, and the axis line between the first adjustment plate and the second adjustment plate is a center of the at least one first arc groove, and a top of the second adjustment plate slides along the at least one first arc groove.

10. The display wall mount according to claim 7, wherein the second connecting mechanism further comprises a connecting member, and the second connecting mechanism is rotatablely coupled to the second support arm through the connecting member, and a bottom of the connecting member is coupled to the bottom of the second adjustment plate.

11. The display wall mount according to claim 10, wherein a top of the connecting member defines at least one second arc groove, and the axis line between the connecting member and the second adjustment plate is a center of the at least one second arc groove, and a top of the second adjustment plate slides along the at least one second arc groove.

12. The display wall mount according to claim 7, wherein the second connecting mechanism further comprises at least one type of display wall bracket coupled to the display, and the at least one type of display wall bracket is removably coupled to the first adjustment plate.

13. The display wall mount according to claim 12, wherein the at least one type of display wall bracket comprises at least one positioning frame and at least one support bar, the at least one support bar is located on the first adjustment plate, and the at least one positioning frame defines at least one hanging hole corresponding to the at least one support bar, and the at least one support bar is capable of engaging with the at least one hanging hole.

14. The display wall mount according to claim 7, wherein the first adjustment plate comprises a mounting plate, and two pairs of flanges extending from two opposite sides of the mounting plate toward a same side; each flange defines an engaging hole; the second connecting mechanism further comprises a support frame, the support frame comprises two support bars spaced apart, and the two support bars are respectively inserted into corresponding engaging holes of the first adjustment plate.

15. The display wall mount according to claim 14, the first adjustment plate comprises a pair of first lugs and a pair of second lugs spaced from the pair of the first lugs; the first lugs, the second lugs and the pairs of flanges are located on the same side of the mounting plate; the pair of the first lugs each defines a shaft hole along the sliding direction of the connecting frame, for coupling with a bottom of the second adjustment plate, the pair of the second lugs each defines a first arc groove, the first adjustment plate further comprises two adjustment handles; each adjustment handle comprises a screw for passing through one corresponding first arc groove so as to slidably couple the first adjustment plate with the second adjustment plate.

16. The display wall mount according to claim 15, wherein the pair of the first lugs and the pair of the second lugs are located in a middle of the mounting plate, the first lugs are located at below the second lugs.

17. The display wall mount according to claim 13, wherein each positioning frame comprises a connecting bar for fixing on the display, two flanges protruding from opposite sides of the connecting bar and extending towards the same side, and a clip; a pair of hanging holes are formed on a top of the two flanges respectively, and a pair of positioning ports are formed on a bottom of the two flanges respectively.

* * * * *